United States Patent
Maeng et al.

(10) Patent No.: US 12,254,516 B1
(45) Date of Patent: *Mar. 18, 2025

(54) NETWORK-BASED JOINT INVESTMENT PLATFORM

(71) Applicant: Wells Fargo Bank, N.A., San Francisco, CA (US)

(72) Inventors: Joon Maeng, Newcastle, WA (US); Andrew J. Garner, IV, State Road, NC (US); Brian J. Jacobsen, Elm Grove, WI (US)

(73) Assignee: Wells Fargo Bank, N.A., San Francisco, CA (US)

( * ) Notice: Subject to any disclaimer, the term of this patent is extended or adjusted under 35 U.S.C. 154(b) by 137 days.

This patent is subject to a terminal disclaimer.

(21) Appl. No.: 18/152,284

(22) Filed: Jan. 10, 2023

Related U.S. Application Data

(63) Continuation of application No. 16/222,485, filed on Dec. 17, 2018, now Pat. No. 11,556,991.
(Continued)

(51) Int. Cl.
G06Q 20/32 (2012.01)
G06F 16/23 (2019.01)
(Continued)

(52) U.S. Cl.
CPC .................... *G06Q 40/06* (2013.01)

(58) Field of Classification Search
CPC ........ G06Q 40/06; G06Q 40/00; G06Q 40/04; G06Q 10/06311; G06Q 10/109;
(Continued)

(56) References Cited

U.S. PATENT DOCUMENTS 5,987,422 A * 11/1999 Buzsaki ........... G06Q 10/06311
705/7.13
6,157,915 A * 12/2000 Bhaskaran ........... G06Q 10/063
705/7.11
(Continued)

FOREIGN PATENT DOCUMENTS

JP 2003022369 A * 1/2003

OTHER PUBLICATIONS

J. Miller, "A proven project portfolio management process," Oct. 3, 2002, Paper presented at Project Management Institute Annual Seminars & Symposium, San Antonio, TX. Newtown Square, PA: Project Management Institute, retrieved from https://www.pmi.org/learning/library/proven-project-portfolio-manage. (Year: 2002).*
(Continued)

*Primary Examiner* — Daniel S Felten
*Assistant Examiner* — Douglas W Pinsky
(74) *Attorney, Agent, or Firm* — SCHWEGMAN LUNDBERG & WOESSNER, P.A.

(57) ABSTRACT

Disclosed in some examples are methods, systems, machine readable mediums that provide a network-based joint investment platform that enforces agreed-upon decision rules on jointly managed investments and provides collaboration and decision-making support tools for joint managers to make decisions about taking actions related to one or more jointly-managed assets. The platform may provide for configuring a plurality of decision rules that identify which managers can take which actions and under what conditions. The joint investment platform may enforce the decision rules by requesting any specified approvals according to the decision rules. Once those rules are satisfied, the joint investment platform may execute the requested actions. If the required approvals are not obtained, or the rules provide no path to approval, the action may not be executed.

18 Claims, 9 Drawing Sheets

Related U.S. Application Data

(60) Provisional application No. 62/611,875, filed on Dec. 29, 2017.

(51) Int. Cl.

| | | |
|---|---|---|
| *G06Q 20/10* | (2012.01) | |
| *G06Q 20/38* | (2012.01) | |
| *G06Q 40/06* | (2012.01) | |
| *H04L 29/06* | (2006.01) | |

(58) Field of Classification Search
CPC .... G06Q 10/10; G06Q 10/101; G06Q 10/103; G06Q 10/063; G06Q 30/00; G06F 3/0481; G06F 3/048; G06N 20/00
See application file for complete search history.

(56) References Cited

U.S. PATENT DOCUMENTS

| | | | | |
|---|---|---|---|---|
| 6,338,047 | B1* | 1/2002 | Wallman | G06Q 40/06 705/36 R |
| 6,507,865 | B1* | 1/2003 | Hanson | G06Q 40/04 705/36 R |
| 6,564,246 | B1* | 5/2003 | Varma | G06Q 10/10 709/205 |
| 6,832,202 | B1* | 12/2004 | Schuyler | G06Q 10/06311 705/7.26 |
| 6,939,137 | B1* | 9/2005 | Colaio | G06Q 20/10 434/107 |
| 6,980,983 | B2* | 12/2005 | Banerjee | G06Q 10/00 |
| 7,028,006 | B1* | 4/2006 | Marsden | G06Q 40/00 705/35 |
| 7,321,864 | B1* | 1/2008 | Gendler | G06Q 10/06 705/7.15 |
| 7,664,664 | B2* | 2/2010 | King | G06Q 10/06 705/7.28 |
| 7,813,977 | B2* | 10/2010 | Heaton | G06Q 40/00 705/35 |
| 7,835,596 | B2 | 11/2010 | Hornback, Jr. et al. | |
| 8,082,517 | B2 | 12/2011 | Ben-shachar et al. | |
| 8,688,559 | B2 | 4/2014 | Calman et al. | |
| 8,965,349 | B2 | 2/2015 | Kieft | |
| 9,261,603 | B2 | 2/2016 | Mirkin | |
| 10,937,098 | B2* | 3/2021 | Sujir | G06Q 40/06 |
| 2001/0034641 | A1* | 10/2001 | D'Amico | G06Q 40/06 705/12 |
| 2001/0042037 | A1* | 11/2001 | Kam | G06Q 20/0855 705/36 R |
| 2002/0038236 | A1* | 3/2002 | Schechter | G06Q 40/04 705/12 |
| 2002/0165814 | A1* | 11/2002 | Lee | G06Q 40/04 705/37 |
| 2003/0120575 | A1* | 6/2003 | Wallman | G06Q 40/06 705/36 R |
| 2004/0236660 | A1* | 11/2004 | Thomas | G06Q 10/10 705/37 |
| 2005/0273422 | A1* | 12/2005 | Villacorta | G06Q 40/025 705/38 |
| 2008/0103957 | A1 | 5/2008 | Murphy | |
| 2008/0147581 | A1* | 6/2008 | Larimer | G06F 16/335 706/45 |
| 2008/0243716 | A1* | 10/2008 | Ouimet | G06Q 40/06 705/36 R |
| 2009/0094169 | A1 | 4/2009 | Kim et al. | |
| 2013/0211927 | A1* | 8/2013 | Kellogg | G06Q 30/0629 705/14.73 |
| 2014/0032810 | A1 | 1/2014 | Kanigicherla et al. | |
| 2015/0081511 | A1* | 3/2015 | Himmelstein | G06Q 20/382 705/37 |
| 2015/0379554 | A1* | 12/2015 | Copeland | G06Q 30/0239 705/14.39 |
| 2016/0225082 | A1* | 8/2016 | Sachs | G06Q 40/04 |
| 2017/0193514 | A1* | 7/2017 | Chen | G06Q 20/4016 |
| 2017/0301017 | A1* | 10/2017 | Magdelinic | G06Q 40/04 |
| 2018/0108088 | A1* | 4/2018 | Shamis | G06Q 40/06 |
| 2018/0308172 | A1* | 10/2018 | Daniels | G06Q 40/10 |
| 2021/0082045 | A1* | 3/2021 | Assia | G06Q 20/0655 |

OTHER PUBLICATIONS

"U.S. Appl. No. 16/222,485, Appeal Brief filed Jul. 5, 2022".
"U.S. Appl. No. 16/222,485, Examiner Interview Summary mailed Nov. 9, 2021", 2 pgs.
"U.S. Appl. No. 16/222,485, Final Office Action mailed Feb. 3, 2022".
"U.S. Appl. No. 16/222,485, Final Office Action mailed Mar. 2, 2021".
"U.S. Appl. No. 16/222,485, Non Final Office Action mailed Aug. 19, 2021".
"U.S. Appl. No. 16/222,485, Non Final Office Action mailed Oct. 26, 2020".
"U.S. Appl. No. 16/222,485, Notice of Allowance mailed Sep. 14, 2022".
"U.S. Appl. No. 16/222,485, Response filed Jan. 26, 2021 to Non Final Office Action mailed Oct. 26, 2020".
"U.S. Appl. No. 16/222,485, Response filed Jun. 2, 2021 to Final Office Action mailed Mar. 2, 2021", 20 pages.
"U.S. Appl. No. 16/222,485, Response filed Nov. 19, 2021 to Non Final Office Action mailed Aug. 19, 2021".
Miller, J, ""A proven project portfolio management process," Oct. 3, 2002, Paper presented at Project Management Institute Annual Seminars & Symposium, San Antonio, TX. Newtown Square, PA: Project Management Institute, retrieved from https://www.pmi.org/learning/libr", (Oct. 3, 2002), 19 pgs.
Miller, Jean, "A Proven Project Portfolio Management Process", (Oct. 3, 2002), 19 pgs.
Miller, Jean, "A Proven Project Portfolio Management Process", Paper presented at Project Management Institute Annual Seminars and Symposium, (Oct. 3, 2002), 19 pgs.

* cited by examiner

NETWORK-BASED JOINT INVESTMENT PLATFORM

PRIORITY CLAIM

This patent application is a continuation of U.S. patent application Ser. No. 16/222,485, which claims the benefit of priority, under 35 U.S.C. Section 119 to U.S. Provisional Patent Application Ser. No. 62/611,875, entitled "Network-Based Joint Investment Platform," filed on Dec. 29, 2017, each of which are hereby incorporated by reference herein in their entirety.

TECHNICAL FIELD

Embodiments pertain to network-based investment platforms. Some embodiments relate to network-based investment platforms that facilitate management of an asset by multiple parties.

BACKGROUND

Investment decisions may be made by one or more individuals or groups of individuals that own the investment or are authorized to manage the investment. These investment managers may utilize one or more online tools to manage the investment and to take actions on those investments including buying, selling, trading, or the like.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
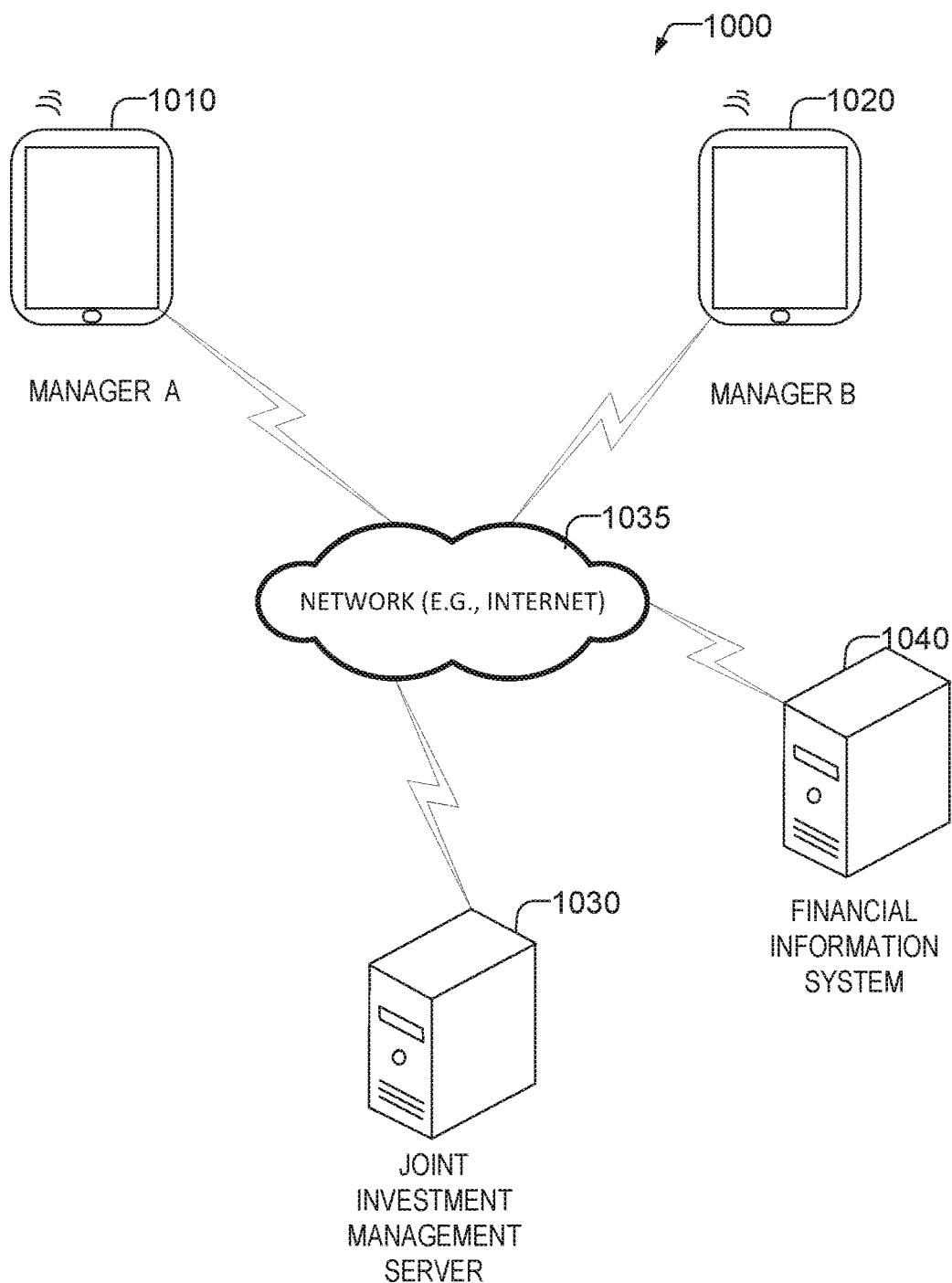
FIG. 1 illustrates an example network-based joint investment environment according to some examples of the present disclosure.

Computer-based investment applications allow managers the ability to take actions on an investment, such as buying, selling, and trading one or more assets or investments. Additionally, these applications may provide decision-making support tools that help managers analyze these actions. These decision making support tools are not configured for investments that have multiple managers. For example, with current tools, if a manager has access to the account they may take action regardless of any agreement the co-managers may have about who can act and when. Thus a manager may be permitted to take an action that is not allowed based upon the agreement between the managers. Additionally, these decision making support tools also do not provide the collaborative decision making support necessary for these jointly managed investments to assist all managers in deciding together whether action should be taken.

Disclosed in some examples are methods, systems, machine readable mediums that provide an improved network-based joint investment platform that solves these problems by enforcing agreed-upon decision rules on jointly managed investments and providing collaboration and decision-making support tools for joint managers to make decisions about taking actions related to one or more jointly-managed assets. The platform may provide one or more graphical user interfaces (GUIs) to one or more of the managers. The GUI may allow for configuring a plurality of decision rules that identify which managers can take which actions and under what conditions. The joint investment platform may enforce the decision rules by requesting any specified approvals according to the decision rules. Once those rules are satisfied, the joint investment platform may execute the requested actions. If the required approvals are not obtained, or the rules provide no path to approval, the action may not be executed. In addition, the network-based joint investment platform may provide one or more integrated collaboration tools to allow managers to communicate about potential actions. Examples include text messaging, voice communications, video communications, and the like. In some examples, the network-based joint investment platform may provide one or more decision-making tools to help managers come to a decision. Examples include business intelligence analysis tools and tie-breaker tools. The tie-breaker tools may have one or more phases, and may utilize criteria selected by the joint managers and real-time analytical information about those criteria.

Decision rules may specify an action, a manager or group of managers, and permissions for the action for the manager or group of managers. Actions may include buying, selling, trading, or other actions related to an asset. The actions may include ranges, such as dollar limit and time period ranges. For example, the rule may specify that a particular manager is authorized to purchase stock of a total price of less than $500.000 every week without approval. Another example rule is that if the particular manager wants to trade more than $500.00 a week, approval of 50% of managers is necessary. Decision rules may allow the managers to take unilateral action, action upon agreement with another manager, action upon agreement with a predetermined number or percentage of other managers, or action upon agreement with all the managers.

A manager may take action through a GUI provided by the network-based joint investment platform. If the action requires the approval or consent of other managers, those other managers may be notified via the GUI and may be presented through the GUI with an opportunity to provide their approval or disapproval. Decision rules may be entered by one or more managers into the GUI and may be stored by the network-based joint investment platform. Modifications to the rules may be restricted based upon other rules that specify which managers may modify the decision rules and under which conditions the decision rules may be modified.

In addition to providing decision rules, the network-based joint investment system may provide joint managers with collaboration tools and decision-making tools to help them come to a decision. For example, a chat window next to a financial information window showing the proposed action. Joint managers may bounce ideas off each other and discuss the potential action while presented with real-time financial information about the action. For example, current financial information relevant to the potential action may be displayed and may be synchronized across all the screens of the participating collaborators (e.g., joint managers that are participating in a collaboration session). In some examples the joint managers may not be able to come to an agreement. In these examples, a tiebreaker may be provided.

Tiebreakers may be informative, or may be binding depending on how the account is setup. Tiebreakers may have one or more phases and each phase may utilize different criteria. For example, a tiebreaker may utilize predetermined criteria of each manager. The criteria may include criteria in financial, environmental, social responsibility, and governance categories. For example, a financial criterion may be "earnings per share" that may measure earnings divided by shares of the company. Environmental, social, and governance categories may measure the environmental impact, social impact, and quality governance scores of an organization that may be subject to a transaction. Third party services may rate a particular organization on these criteria and this ranking may be used as one or more criteria. Each criterion may have a weight, which may be set by the joint manager, the system, or a machine learning algorithm based upon training data of decisions made in the past by the manger or group of managers. The weights and the criteria may be common to all managers or may be specific to each manager.

The tiebreaker may calculate a score for the action for each manager to assist the manager in making a decision based upon the weight based upon the criteria. Each criterion may be scored based upon how closely the real-time information about the asset matches desired performance as entered by the manager. These scores are then multiplied by the weighting factor and summed to produce a final score. As noted, the criteria may be based upon financial indicators.

In other examples, one or more of the criteria may be questions that elicit subjective ratings from each manager. For example, whether the manager sees a perceived risk of a downturn in the near future, and the like. These questions may be decided upon in advance by the managers. In some examples, the questions may be supplied by the managers, or may be selected by the managers or by the joint investment platform from a plurality of questions provided by the platform. These questions may be answered with a numerical score (e.g., between a predetermined range), or may be yes/no questions. Managers may not be able to see each other's answers until all managers have completed the tiebreaker and the final results are shown.

The total score may then be shown to each manager (and each individual criterion score) and may be used to inform the manager's decisions. If, after the tiebreaker, the required managers approve the transaction, then the transaction may be carried out. If, after the tiebreaker, the required managers do not approve (disapprove) the transaction, then the transaction may be denied. If there is still disagreement, in some examples, the score may be binding—that is, if the score is equal to or over a predetermined threshold, the manager's approval is secured and if the score is below the threshold, the action may be disapproved for that manager. If the scores for managers required to approve the transaction as a result of the decision rules are all above the threshold, then the action may be approved, else the transaction may be denied.

In other examples, if the managers still do not agree with a position, then a second level of tiebreaker may be entered. For example, managers may have a button or other user interface to indicate that they are still undecided. If a decision to proceed or deny cannot be made based upon the amount of undecided managers remaining, one or more additional tiebreakers may be utilized until a decision can be made. In additional tiebreaker levels additional criteria may be selected-either at the time of the second level tiebreaker or prior to it (e.g., when the account is setup). For example, additional criteria that was not previously considered. Weights may be set up at any time (e.g., at account setup, at the time the second level tiebreaker is entered into, and the like). The process may proceed as the first level tiebreaker did with calculating a score. As with the first level tiebreaker, the score may be binding on managers, or may be advisory. At the time of account setup, the managers may indicate which criteria are used at which tiebreaker level.

In some examples, decision rules may specify what happens on a tie that fails to be broken. For example, the rules may specify that the action be denied. In some examples, the rules may specify that the action is to be taken.

Figure 8:
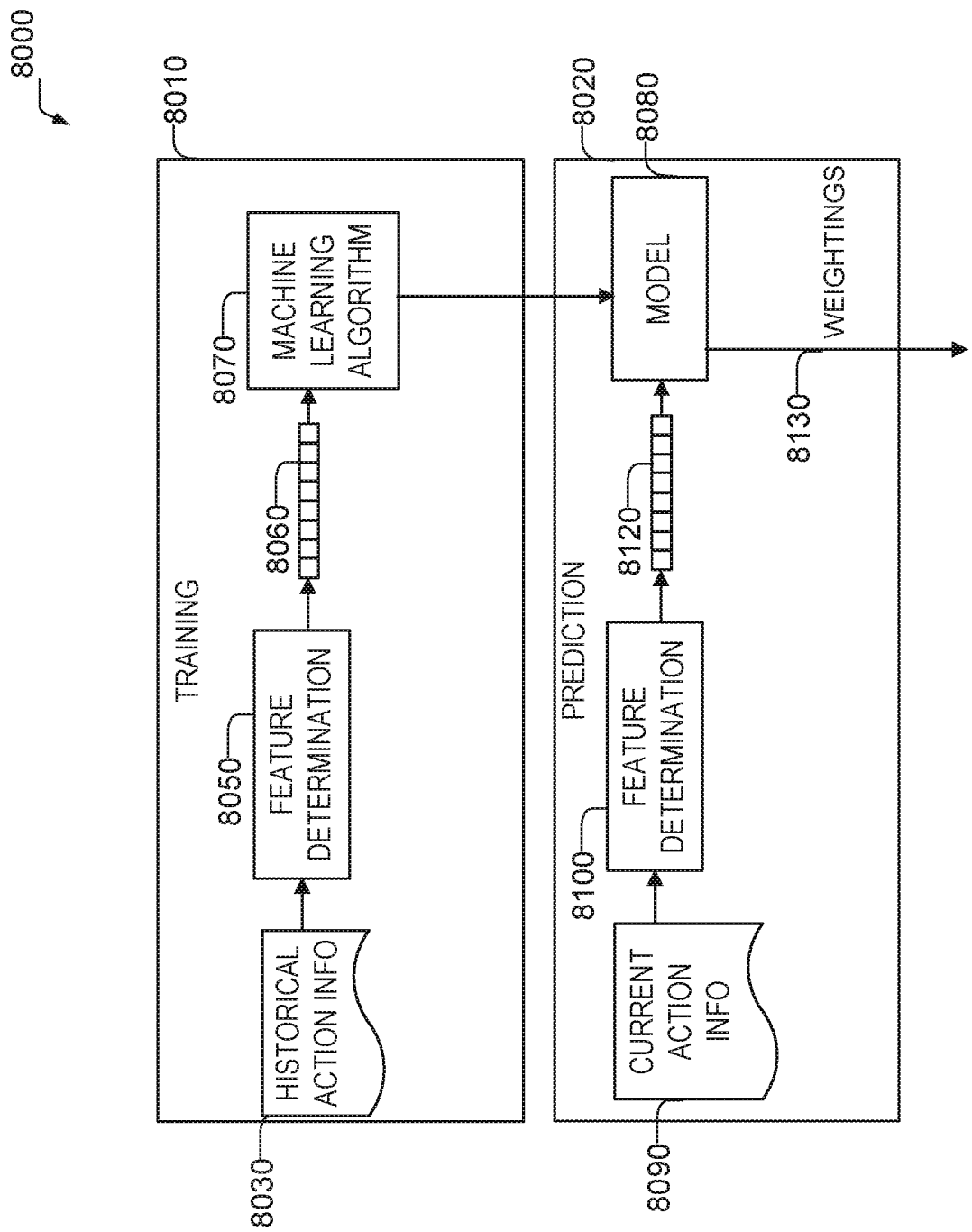
FIG. 8 illustrates an example machine learning module according to some examples of the present disclosure.

In some examples, the weightings of each criteria may be set by managers (at any time—in advance, or during the tie-breaker). These weights may be static—that is, they may not change unless changed by the managers, but in other examples, the score may be initially set by the managers but adjusted by the joint investment management system based upon past decisions by the manager. For example, the weightings may be set or refined by a machine learning model that creates weightings, or refines an initial set of weightings based upon past actions of the manager. For example, information relating to criteria the manager has selected for past actions may be labeled with the decision that the manager ultimately took to refine a manager's subjective weighting of the criteria with objective decisions the manager actually took. That is, the manager may perceive some criteria as more important, but subconsciously, other criteria may in fact be more important. The machine learning model attempts to capture this subconscious weighting. FIG. 8 describes this process in more detail.

Turning now to FIG. 1, an example network-based joint investment environment 1000 is shown according to some examples of the present disclosure. Investment manager A may use a software application on a first computing device 1010 to contact network-based joint investment management server 1030 through network 1035. Investment manager B may use a software application on a second computing device 1020 to manage the same investment through joint investment management server 1030 through network 1035. Network 1035 may be any computer network, such as a Local Area Network (LAN), a Wide Area Network (WAN), the Internet, or the like. Joint investment management server 1030 may provide one or more graphical user interface (GUI) descriptors to one or both of the computing devices 1010-1020. The user interface descriptors may be rendered, or otherwise used by, the application on computing devices 1010, 1020 to render one or more graphical user interfaces (GUIs) that provide for the ability to take actions with respect to the asset including decision making and provide decision making assistance. Example UI descriptors include one or more HyperText Markup Language (HTML) files, extensible Markup Language (XML) files, Cascading Style Sheets (CSS), JavaScript files, other script files, Java files, and the like.

Financial information system 1040 may provide market information about one or more assets and actions involving those assets. For example, the joint investment management server 1030 may utilize the financial information system 1040 to provide up-to-date financial information about one or more of the assets that are being jointly managed and a financial impact of one or more actions upon those assets. In addition the joint investment management server 1030 may utilize information from the financial information system in the tie-breakers—for example, by using financial information system 1040 to obtain financial information to calculate tie-breaker scores.

In some examples, the financial information may be obtained directly or in some examples, indirectly via storage in intermediary systems on or off premise. For example, subscription services where data is internally curated and housed.

Figure 9:
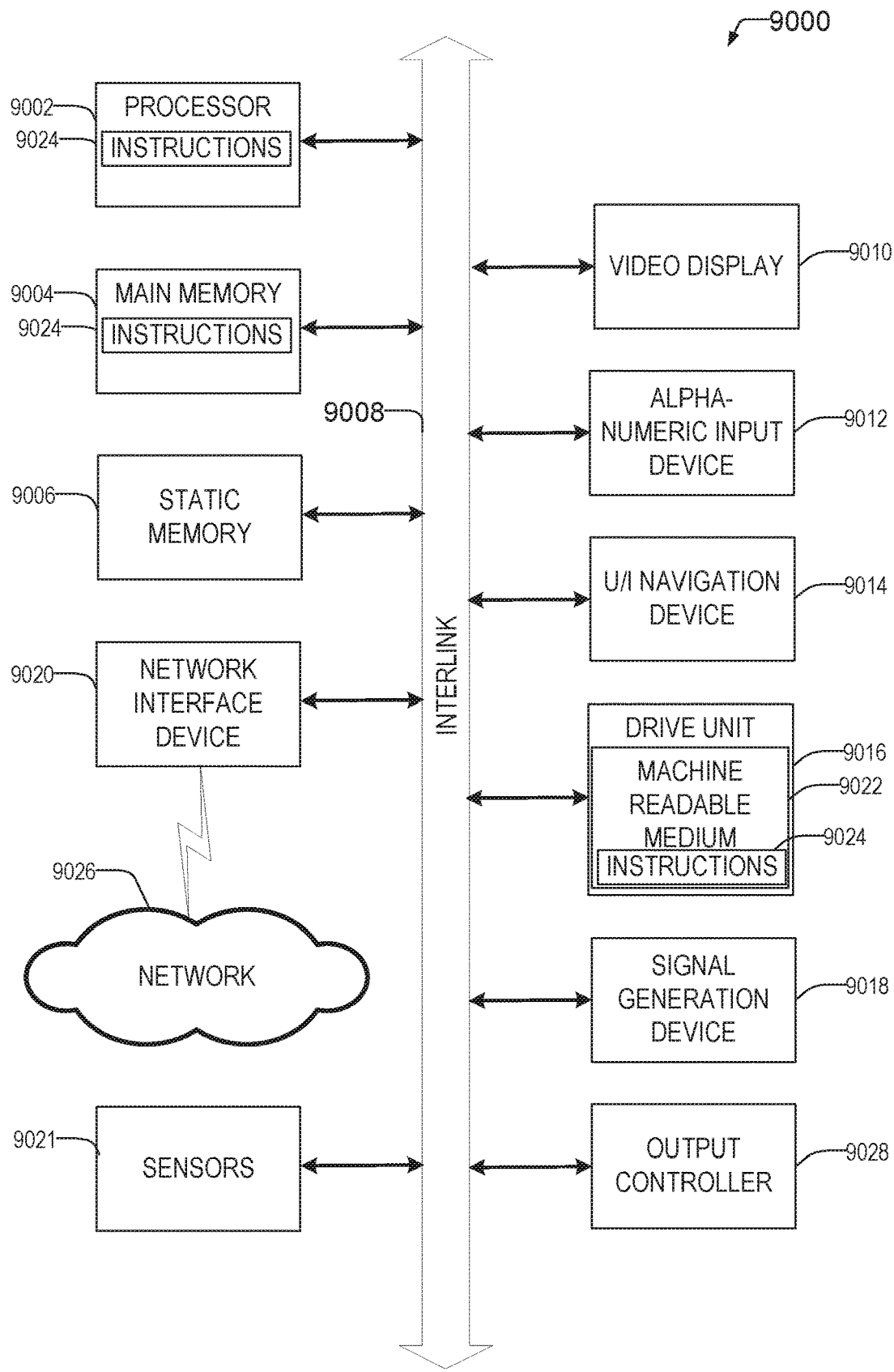
FIG. 9 illustrates a block diagram illustrating an example of a machine upon which one or more embodiments may be implemented.

First computing device 1010, second computing device 1020, joint investment management server 1030, financial information system 1040 and the like may communicate through network 1035 using wired, wireless, or a combination of wired and wireless links. Computing devices may include desktops, tablets, smartphones, and the like-components of an example computing device is shown in FIG. 9, and the like.

Joint investment management server 1030 may provide the ability of manager A and B to take actions on assets jointly managed by manager A and B (and in some examples, additional managers—not shown for clarity) subject to decision rules. Joint investment management server 1030 may seek approvals for actions where decision rules require approvals. For example, the joint investment management server 1030 may allow for buying, selling, and trading assets. Other advanced actions such as options, puts, shorting, hedging, and the like may also be taken. Joint investment management server 1030 may facilitate collaborative communication sessions between computing device 1010 and 1020 so that manager A and manager B may discuss proposed actions. Furthermore, joint investment management server 1030 may create and manage one or more tiebreaking sessions.

Figure 2:
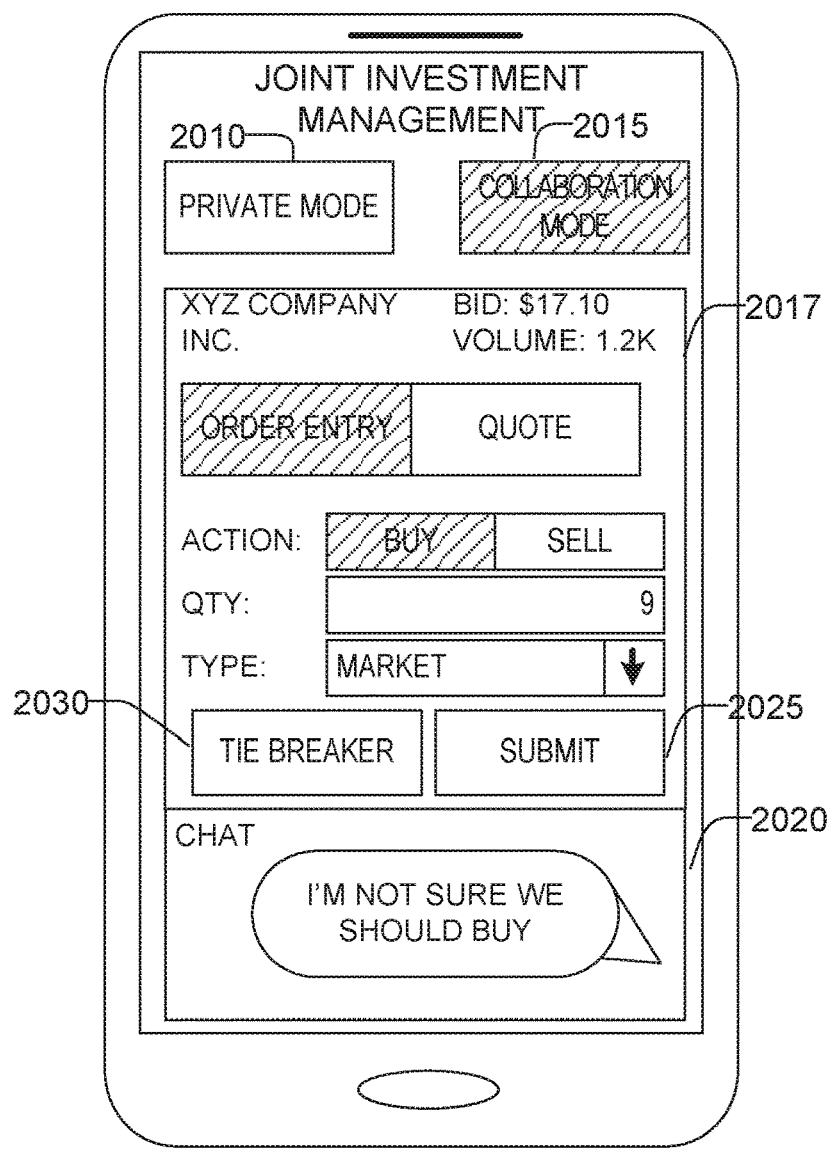
FIG. 2 illustrates an example GUI provided by the joint investment management server according to some examples of the present disclosure.

Turning now to FIG. 2 an example GUI 2000 provided by the joint investment management server 1030 is shown according to some examples of the present disclosure. The GUI may provide one or more user interface elements (e.g., buttons) for a selection of either a private mode 2010 or a collaboration mode 2015. In private mode, decisions may be made without collaboration with another manager, but may still be subject to the decision rules. For example, in private mode 2010, the system may allow the manager to make decisions they are allowed to make given the decision rules. For other decisions, the system may allow the manager to request the decision to be made and the system (e.g., the joint investment management server 1030) may notify other managers to obtain any necessary approvals. E.g., a co-manager may receive a notification that a manager has requested to take an action and the co-manager may either agree with the action or disagree. These notifications may be a push notification that is displayed in a notification area of the co-manager's computing device. The notification may be selected and a focus of an operating system of the computing device of the co-manager may be shifted to an application corresponding to the joint investment management system and the proposed transaction may be displayed. If the co-manager agrees to the transaction, and all the conditions are satisfied, the system may take the action. In some examples, the rules may specify that one or more actions require a predetermined number or percentage of managers to agree. In these examples, if the predetermined number or percentage of managers agrees, the action may be executed. If approval cannot be obtained, one or more tiebreakers may be initiated as described throughout.

Once collaboration mode 2015 is selected, the user may select one or more other joint managers to collaborate with. For example, the user may select from the available managers from a drop down menu. Real-time availability status may be displayed-based upon whether the user is currently in the application and/or online. Participants may then be invited and if they accept, may enter the collaboration session. In a collaboration session, participants may have certain GUI elements synchronized. For example, action selection and information panel 2017 may be synchronized across the participants, and the like. Thus, a change in the quantity field (QTY) may be reflected across all manager devices that are participating in the collaboration. In addition, a chat panel 2020 may appear where managers may discuss the action. A user may leave the collaboration mode by selecting the private mode 2010 using a button. In addition to or instead of chat, during collaboration mode other communications such as voice and video conferencing may be provided. As shown in FIG. 2 the elements are buttons, but in other examples the elements may be radio boxes, check boxes, dropdown menus, tabs, or the like.

Action selection and information panel 2017 may allow for taking actions and may provide information about those actions. For example, a stock company name, a bid price, the volume of the stock, various options for buying selling, a quantity, a type, a submission button, and the like. To complete an action or indicate assent to an action, the user may click the submit button 2025. If there is a tie—e.g., one manager wants to take the action and another does not, the managers may initiate a tie breaking process using button 2030—e.g., a decision assistance process.

Tiebreakers may be initiated at the request of one or more joint managers (e.g., a threshold number or percentage of managers request a tiebreaker), if a threshold number or percentage of managers approve the transaction but the threshold is not enough to approve the transaction outright, and/or if a threshold number or percentage of joint managers indicate they are not sure what to do. The particular conditions for initiating a tiebreaker may be based upon the action rules.

Figure 3:
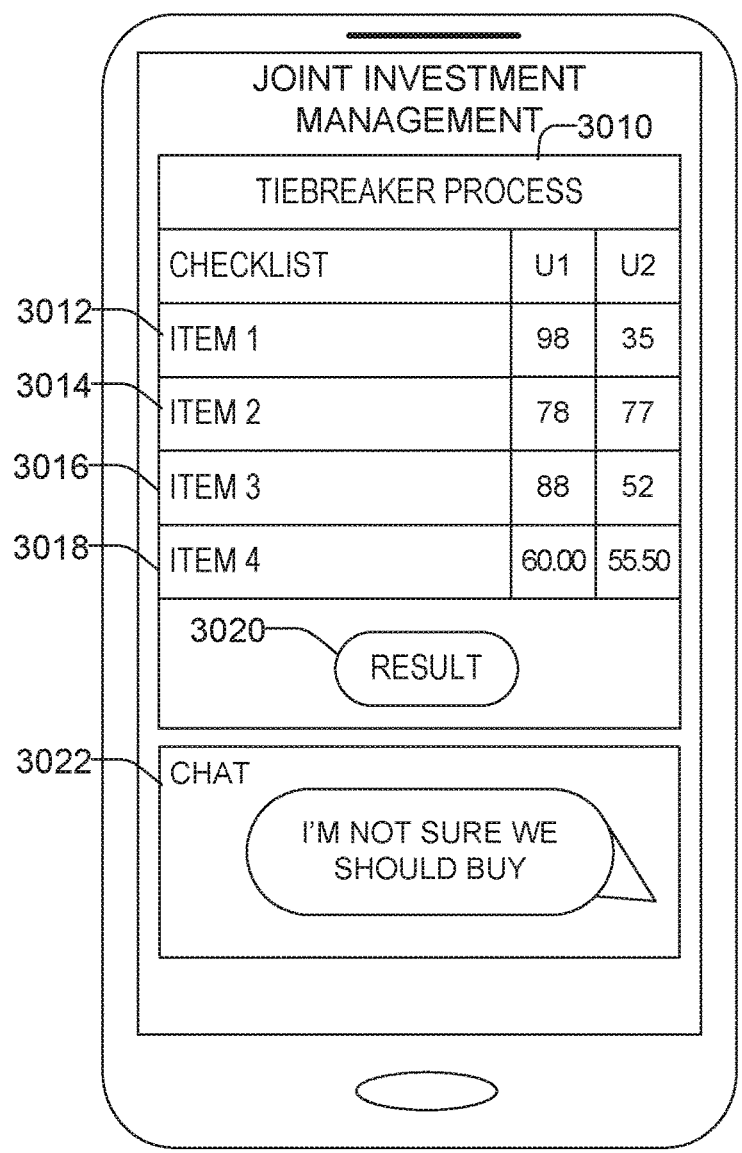
FIG. 3 illustrates an example GUI provided by the joint investment management server according to some examples of the present disclosure.

Turning now to FIG. 3, an example GUI 3000 provided by the joint investment management server 1030 is shown according to some examples of the present disclosure. Tiebreaker process window 3010 is shown with rows of criteria. For example item 1 3012 may request a subjective score from a manager on a first question about the action. Item 2 3014 may show the result of an analysis of an objective financial criterion—e.g., information about entities associated with the proposed action (e.g., stock price of the stock proposed for purchase), and the like. Item 3 3016 and item 4 3018 may be either. Each manager may have a column (U1 and U2 in the example of FIG. 3) where the scores for that row are displayed. For formulae, in some examples, the results will be the same for all managers. In other examples, the formulae may be slightly different for each manager as each manager may have a different individual scoring factor. For example, if the formulae is the average growth in stock price of the stock over a 6 month period divided by the growth of the market (e.g., as measured by an index) over the sixth month period multiplied by a predetermined value, each manager may have their own predetermined value.

In some examples, the scores may not be displayed until all scores are entered by all managers. Once a manager has completed the checklist items, the manager may select the "result" button 3020. The manager's score may then be displayed. As other scores are completed, they may also be displayed and a decision result may be displayed. Collaboration window 3022 may allow managers to collaborate and discuss throughout the process of completing the tiebreaker.

Should another tiebreaker level be necessary, one or more of the managers may request another tiebreaker. As noted above, in a second tiebreaker level, the managers may select secondary criteria and use those to score the action.

Figure 4:
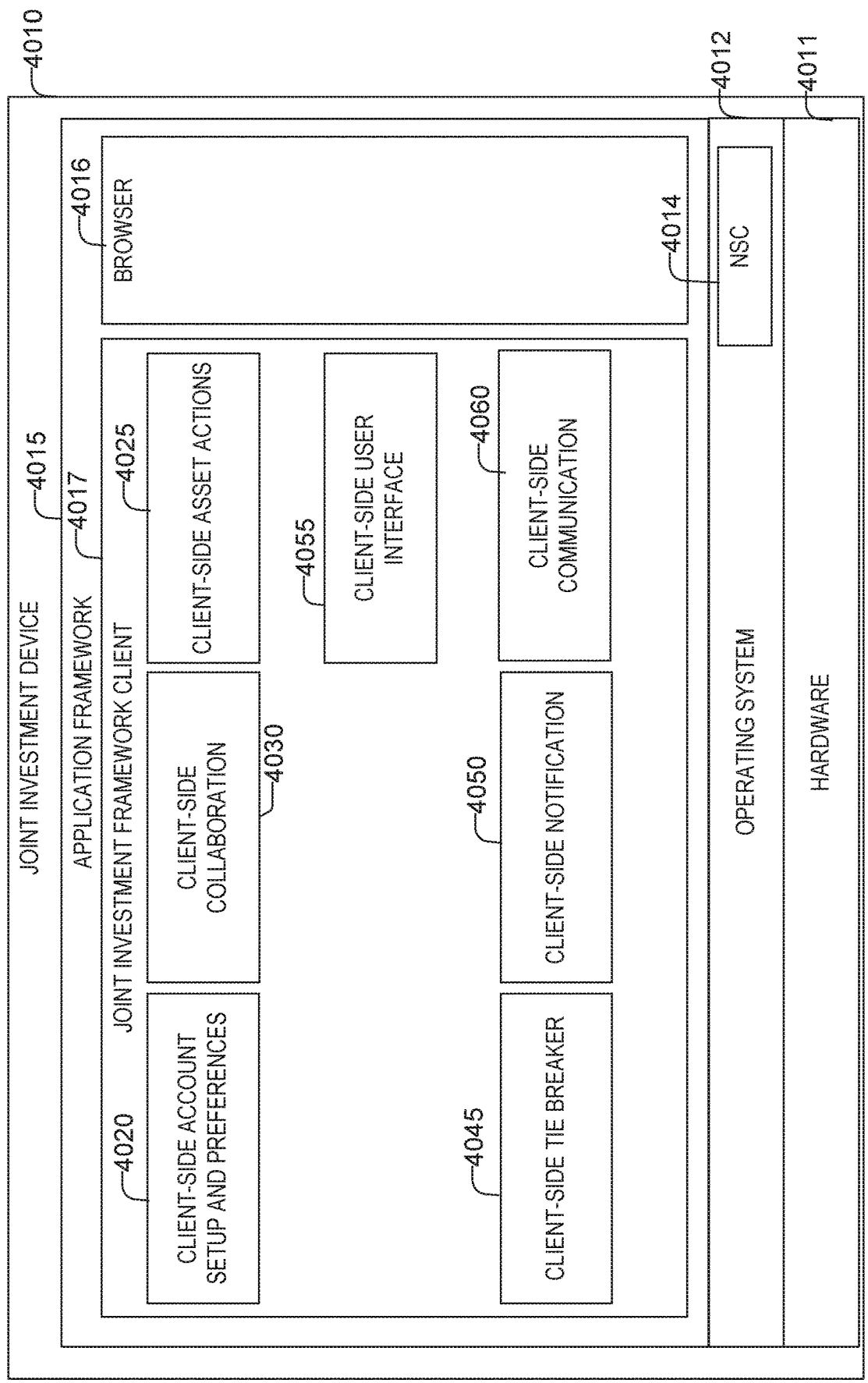
FIG. 4 illustrates a schematic of a joint investment device according to some examples of the present disclosure.
Figure 5:
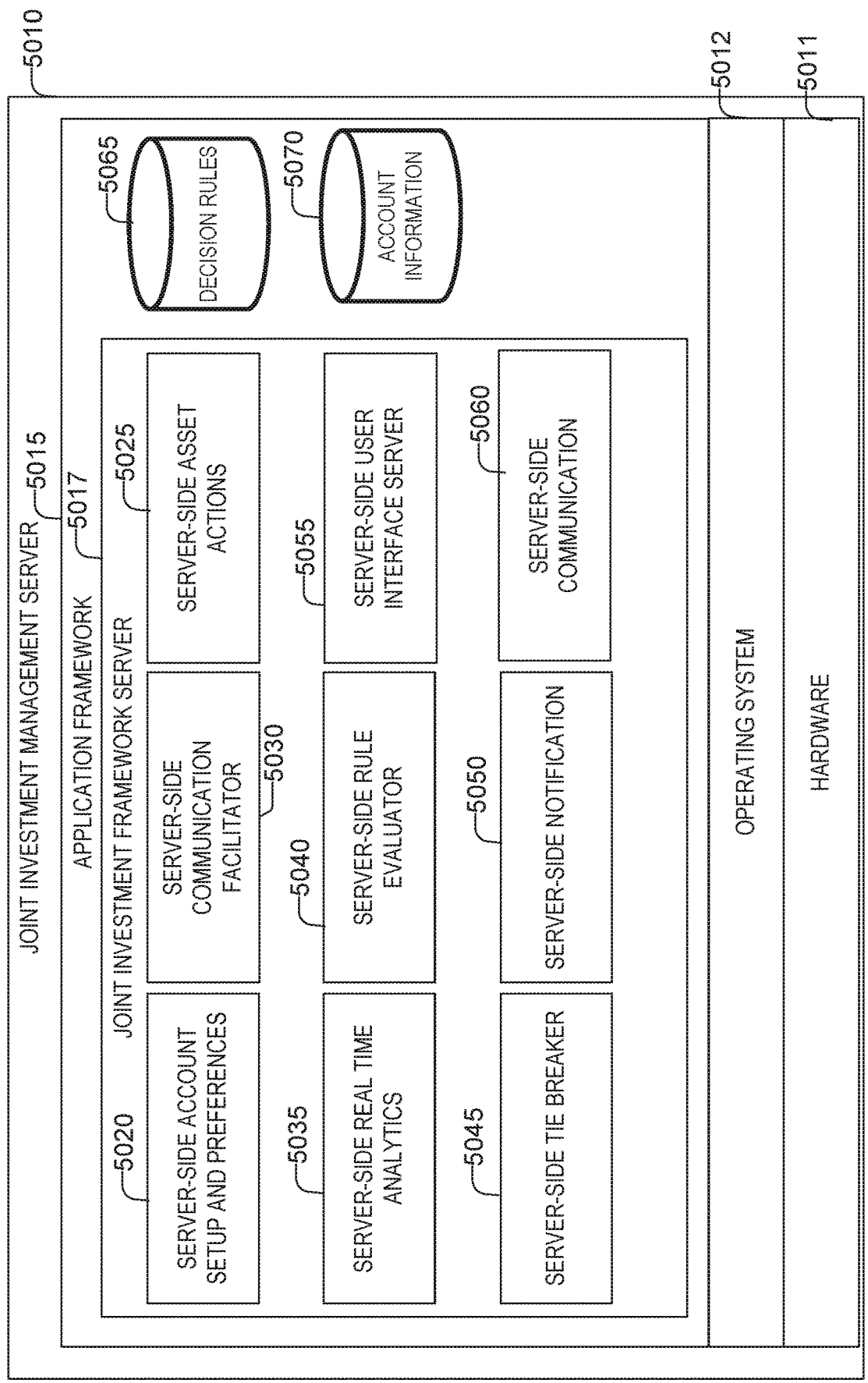
FIG. 5 illustrates a schematic of a joint investment management system according to some examples of the present disclosure.

FIG. 4 shows a schematic of a joint investment device 4010 according to some examples of the present disclosure. FIG. 5 shows a schematic of a joint investment management system 5010 according to some examples of the present disclosure. Joint investment device 4010 may be a general purpose computing device configured to provide joint investment services such as computer devices 1010, 1020 of FIG. 1, and may provide a Graphical User Interface of FIGS. 2 and 3. Joint investment device 4010 may have hardware 4011, such as a processor, a network interface card, memory (such as non-volatile memory), sensors, and the like. Operating system 4012 may be software executable on the hardware that provides an interface to hardware 4011 for higher level applications in the application framework 4015 as well as providing other services for the application framework 4015 such as hardware (processor) scheduling, memory allocation, and other services. Application framework 4015 may be an application layer of a computing system and may be administered by the operating system 4012. Application framework 4015 may be one or more software applications executing on the hardware 4011—e.g., by configuring the hardware to process the instructions. In some examples, the application framework 4015 may comprise stand-alone applications executing on a processor with the assistance of the operating system 4012, but in other examples the application framework 4015 may comprise applications executing within another application, such as applications executing within a browser application 4016.

Similarly joint investment management server 5010 may be a general purpose computing device configured to provide joint investment services. Joint investment network server 5010 may be an example of joint investment management server 5010 and may assist in the creation of user interfaces in FIGS. 2 and 3 and may execute the methods of FIGS. 6 and 7 and implement the machine learning described in FIG. 8. Joint investment network server 5010 may have hardware 5011, such as a processor, a network interface card, memory (such as non-volatile memory), sensors, and the like. Operating system 5012 may be software executable on the hardware that provides an interface to hardware 5011 for higher level applications in the application framework 5015 as well as providing other services for the application framework 5015 such as hardware (processor) scheduling, memory allocation, and other services. Application framework 5015 may be an application layer of a computing system and may be administered by the operating system 5012. Application framework 5015 may be one or more software applications executing on the hardware 5011—e.g., by configuring the hardware to process the instructions. In some examples, the application framework 5015 may comprise stand-alone applications executing on a processor with the assistance of the operating system 5012.

Turning back to FIG. 4, browser application 4016 may be a network browser that may download and render one or more GUI descriptors. For example, a webpage or the like. Joint investment framework client 4017 may execute within the application framework 4015 as a standalone application (as shown) or as a series of one or more GUI descriptors rendered within browser application 4016 (not shown for clarity). Joint investment framework client 4017 may include a client-side account setup and preferences module 4020, client-side asset action module 4025, client-side communicator module 4030, client-side tie breaker module 4045, client-side notification module 4050, client-side user interface module 4055, and client-side communication module 4060.

Client-side account setup and preferences module 4020 may communicate (via client-side communication module 4060 and server side communication module 5060) with server-side account setup and preferences 5020 of joint investment management network service 5010 to setup the joint investment accounts and transfer control of one or more joint investments to the control of the joint managers via the client-side user interface module 4055. Client-side account setup and preferences module 4020 may allow for joint managers to setup decision rules for taking actions. A process for decision rule setup may include a proposal by an asset manager for a particular rule and voting by the asset managers through their respective joint investment framework instances. In other examples, the decision rules may be setup offline by agreement between the joint investment managers. Server-side account setup and preferences module 5020 may store the account information in an account information data store 5070. Decision rules may be stored in the decision rules data store 5065. Additionally, decision rules may be stored at the joint investment framework client 4017.

Client-side asset action module 4025 may provide one or more GUIs (via client-side user interface module 4055) that allow a manager to take or request one or more actions (depending on the decision rules). The requested action may be sent via the client-side communication module 4060 to the service-side asset actions module 5025 of the joint investment management server 5010 for evaluation. The server-side rule evaluator 5040 may evaluate the requested action against the decision rules in decision rules data store 5065 to determine if the decision is allowed. If the decision is allowed, the action may be executed by the server-side asset actions module 5025, or sent to a third party service for processing. If the action is allowed under the decision rules if approved by additional managers, the joint investment framework server 5017 may utilize server-side notification module 5050 to notify one or more affected managers. For example, the decision rules 5065 may specify that certain managers must approve. In these examples, the affected managers may be specified by the decision rules. In other examples, the affected managers may be all the managers. For example, the decision rules may specify that a majority of managers must agree. In these examples, the notification may include an indication of the action being requested (e.g., the action type-buy, sell, trade), an amount-such as a number of shares, a price, and the like. These notifications are received by the client-side notification module 4050 of the joint investment framework client 4017. The client-side notification module 4050 may notify the user through a notification service 4014 executing as a service of the operating system 4012, or may notify the user in a number of other ways that their approval is requested, such as via the client-side user interface module 4055.

A decision to approve or disapprove the action may be submitted via the client-side user interface module 4055 and this approval or disapproval may be sent to the server-side asset actions module 5025. The server-side rule evaluator module 5040 may evaluate the responses against the decision rules stored in the decision rules 5065 for the requested action and either take the requested action or notify all the managers that the action has been denied.

During the decision making process, one or more of the managers may wish to communicate with each other. Client-side communicator module 4030 may provide one or more communication options for allowing joint managers to communicate with each other. Example communication options include instant messaging, voice, video, short messaging service, and the like. The client-side communicator module 4030 may implement one or more protocols for sending and/or receiving data packets that contain communications to/from one or more joint managers. Communications may be between two joint managers or may be between groups of joint managers. Client-side communicator module 4030 may also work with the client-side user interface module 4055 to synchronize one or more user interface elements between joint managers while in collaboration mode. In some examples, the communications between joint managers may be setup, maintained, routed, or otherwise serviced by the server-side communication facilitator 5030. For example, the server-side communication facilitator 5030 may setup a Session Initiation Protocol (SIP) session between joint managers for purposes of setting up a Voice over Internet Protocol (VOIP) call. The server-side communication facilitator 5030 may forward one or more communication packets from a first client device to one or more other client devices. In some examples, the server-side communication facilitator 5030 may instruct the various client-side user interface modules 4055 to display synchronized information.

Client-side tie breaker module 4045 and server-side tie breaker module 5045 may provide one or more tiebreaker services. For example, server-side tie breaker module 5045 may retrieve one or more criteria for the user and send it to the client-side tie breaker module 4045. For criteria that are based upon financial data, the server-side tiebreaker module 5045 may retrieve the current financial data from one or more outside sources via the server-side real time analytics module 5035. Either the client-side or server-side tie breaker modules may then evaluate the financial data based upon the criteria. For example, a criterion may be in the form of a rule. In some examples, these rules may be if-then-else rules, such as of the form: if_financial data_ (!=, =, <, >, <=, >=)<value> then _point value_. So-one example may be if 5 year growth >10% then 10 points. Other criteria may be in the form of formulas that utilize one or more items of financial data as inputs to a mathematical formula whose result is a point value. For example, points=10*5 year financial growth. One or more subjective components may be part of, or solely comprise the criteria.

Criteria that utilizes subjective components may be input by the user at the time they are making their decision. These criteria may solicit subjective answers to one or more questions. These questions may be displayed and the answers may be entered into one or more user interface controls using the client-side user interface module 4055. For example, a criterion including a subjective component may be "Do you feel that international funds are going to outperform mutual funds in the next 16 months?" or "What is the probability (%) that the Federal Reserve will lower interest rates in the next 12 months?" The answers to these questions may then be utilized to produce a point score— either alone, or in combination with other criteria. The subjective criteria may be used as inputs to other criteria that may, for example, utilize financial information.

Each individual criterion may be weighted. The weights may be determined manually by the managers, determined by the joint investment platform, determined by a machine learning model based upon past decisions by the manager (and whether they were profitable), and the like. In some examples, the weightings may be updated—e.g., based upon new decisions and their results. The result of the tie breaker component may be binding—that is, if the point totals of the subjective criteria (as weighted by one or more weights) exceed a threshold, the manager automatically approves. In other examples it is advisory only.

In some examples, the joint investment framework client 4017 of a first computing device of a first asset manager may communicate with a second joint investment framework executing on a second computing device of a second asset manager. In some examples, rather than through a joint investment framework server, the communication and operations of the joint investment management system may be peer-to-peer where the decision rules, tie breakers, and other functions are done locally on each computing device or in a distributed manner across the group of computing devices. Thus, one or more of the modules of FIG. 5 may be implemented on the joint investment framework client 4017. To execute an asset action, one or more of the computing devices may contact a financial system, such as a joint investment management server 1030 or the like to execute the action. In other examples, some of the functionality may be performed by the joint investment management server 1030.

Server-side user interface server 5055 may send information to client-side user interface module 4055 used to create one or more user interfaces. For example, one or more graphical user interface descriptors that are rendered via the client-side user interface module 4055 (e.g., through browser 4016). Example GUI descriptors include one or more cascading style sheets (CSS), hypertext markup language (HTML) documents, extensible markup language (XML) documents, scripting files, code objects, and the like. Server-side communications module 5060 and client-side communication module 4060 may implement one or more communication protocols to enable these components to communicate and share data packets with each other.

In some examples, one or more parts of the platform may be implemented using a distributed ledger utilizing a blockchain. For example, a blockchain may manage the rules and execution of those rules by using smart contracts to house the rules and the "state" values of various decisions or results from execution of those rules. In these examples, each manager may be a peer on a localized "channel' of a broader blockchain network. The blockchain may be maintained by each computing device of each manager, or by the joint investment management server.

Figure 6:
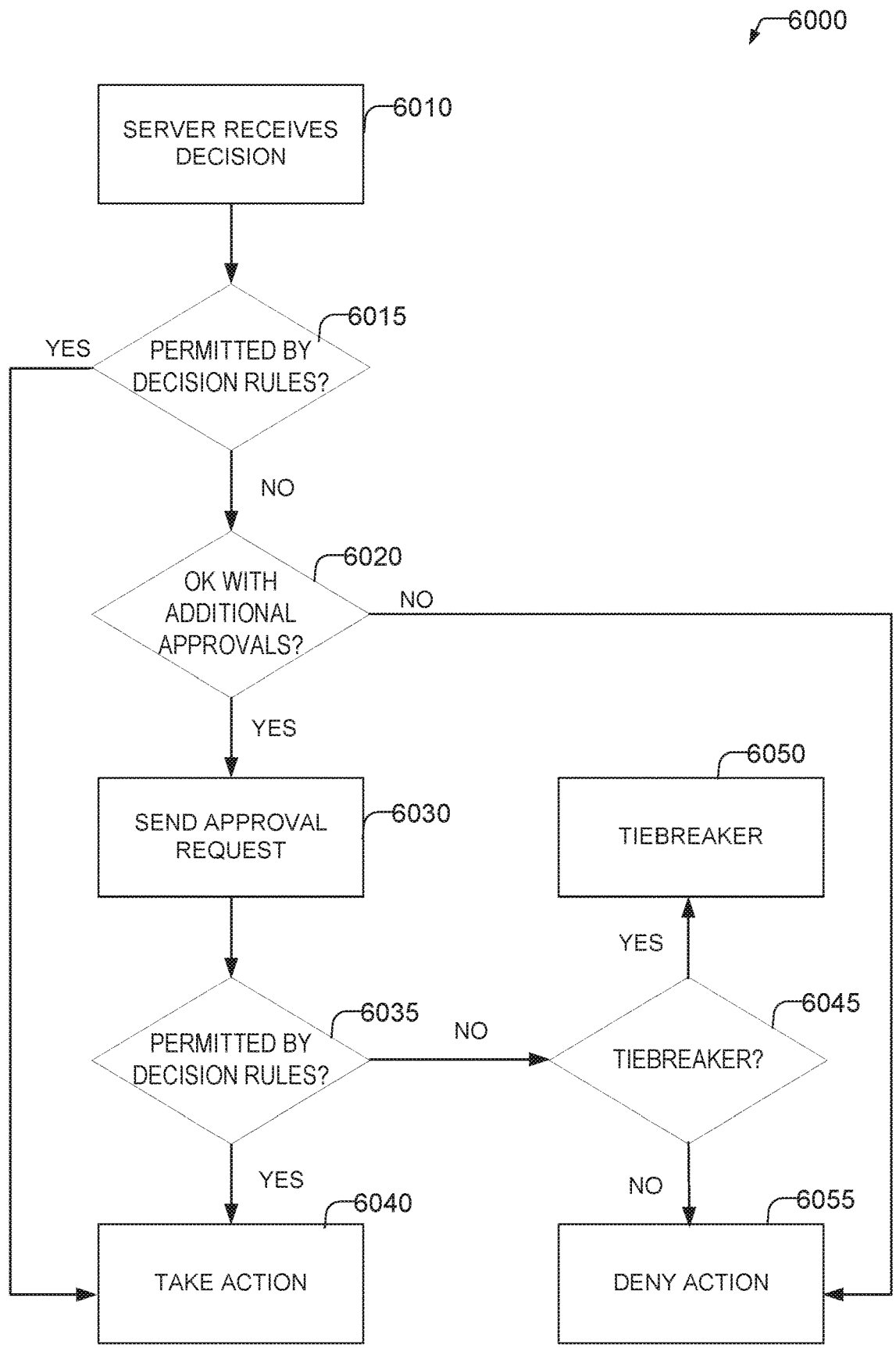
FIG. 6 illustrates a flowchart of a method performed by a joint investment management service in managing a joint investment across multiple computing devices according to some examples of the present disclosure.

FIG. 6 shows a flowchart of a method 6000 performed by a joint investment management service (e.g., such as joint investment management server 5010) in managing a joint investment across multiple computing devices according to some examples of the present disclosure. In some examples, the joint investment management service may provide one or more GUI descriptors for display on computing devices of joint investment managers, including one or more financial indicators, account information, asset information, and the like. An asset manager may review the information and may decide to take one or more actions on the assets. In some examples, assets managed may be one or more of an investment account (including available cash, stocks, bonds, and the like), property, real estate, and the like. The joint investment framework client of the asset manager may register an input indicative of a request to take an action regarding the jointly managed investments. This indication may be sent to the joint investment management service and may be received at operation 6010. For example, an indication may be a type of action requested, the user requesting the action, details about the action, and the like.

At operation 6015 the joint investment management service may evaluate the action, properties of the action (e.g., the asset the action relates to, a monetary value, and the like), and the manager it was received from against the decision rules setup for the joint investment account. If the action is permitted by the decision rules at operation 6015, then flow proceeds to operation 6040 where the action is taken. In some examples, the joint investment management service may include or be communicatively coupled to a service (e.g., a trading platform) that may execute the action. If the action request is not permitted by the decision rules, the joint investment management service may evaluate whether the decision rules would allow the action if additional managers approved at operation 6020. If the action would not be allowed if additional managers approved, then at operation 6055, the action may be denied (e.g., a notification of denial may be sent to the manager that requested the action).

If the action would be allowed given additional approvals, then at operation 6030 the joint investment management service may send approval requests to computing devices of other joint managers. As previously described the joint managers that the system notifies may be determined by the decision rules. The system may then wait for approvals. In some examples, the system may wait until enough approvals or disapprovals have been received to either take the action or deny the action according to the decision rules. For example, if the decision rules require a majority of managers to approve a decision and there are 5 managers, once the third approval is received, the system may take the action. In other examples, the system may only wait a certain time for answers. Managers not answering within the certain time period may be considered to have either rejected or accepted the action. Whether silence is considered acceptance or rejection may be setup in advance, or may be part of the decision rules (on a per action basis). This allows for rules where an action is taken unless a manager explicitly rejects it.

At operation 6035 the joint investment management service may evaluate the rules either once all the responses are received, as each response is received, or once the timer expires, or the like. If the action was approved by the joint managers then the action may be caused to be executed at operation 6040. In some examples, the joint investment management service may execute the action, but in other examples the joint investment management service may send a request to another server or service to perform the action. If the action was not taken, in some examples, the system may consider a tiebreaker at operation 6045. In some examples, a tiebreaker is triggered when a threshold number of joint managers consent to the action, but not enough consent to take the action. In other examples, a tiebreaker may be triggered by one or more of the managers (e.g., through a UI control), or the like. If the tiebreaker is indicated or requested, then at operation 6050 a tiebreaker is performed. The result of the tiebreaker may be taking the action, or denying the action. If the tiebreaker is not indicated or requested, then at operation 6055 the action may be denied.

Figure 7:
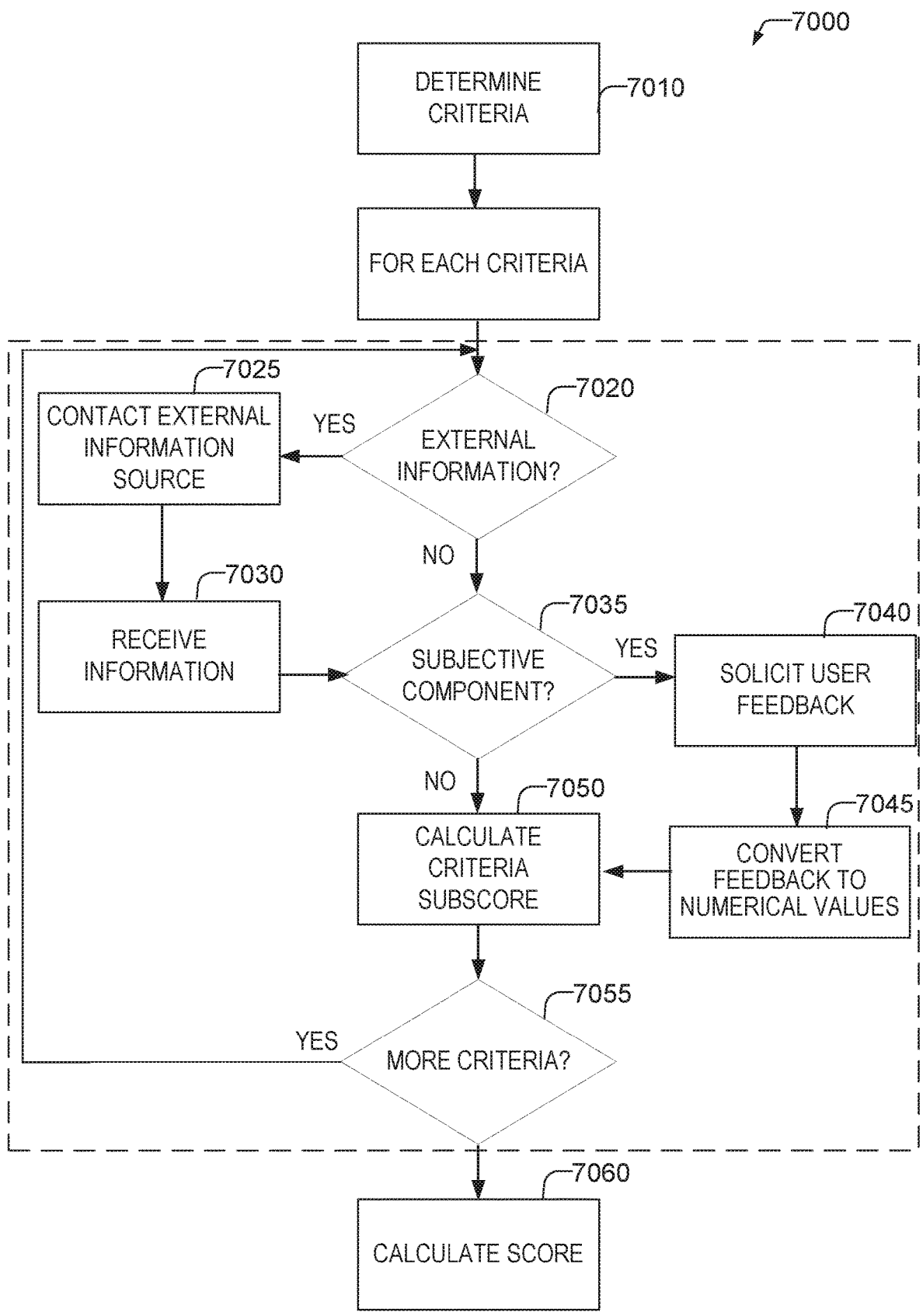
FIG. 7 illustrates a flowchart of a method of performing a tiebreaker according to some examples of the present disclosure.

FIG. 7 shows a flowchart of a method 7000 of performing a tiebreaker according to some examples of the present disclosure. FIG. 7 shows a one level tiebreaking procedure, but as previously described, the system may perform multiple levels with different criteria and different factors in each level. The method of FIG. 7 may be performed by the joint investment management service, the joint investment framework client of the manager's computing device (e.g., joint investment device), or some combination. The operations of FIG. 7 may be performed for each particular manager participating in the tiebreaker. At operation 7010 the system may determine the criteria for this round of tiebreaking. In some examples, the criteria may be determined by loading the criteria from account information for the particular manager, may be received from the joint investment management service, selected by the manager (e.g., through a UI), or the like. For each criterion, the operations of 7020-7055 may be performed. At operation 7020 the system determines if the criterion is based upon, or indicates external information (e.g., current stock prices, etc., . . . ). If yes, then at operation 7025, an external information source may be contacted and the information requested. If the method of FIG. 7 is performed by the joint investment framework client, the client may contact the joint investment management service. The joint investment management service may then contact an external information source. At operation 7030 the external information may be received. At operation 7035, a determination is made as to whether there is a subjective component. If there is, then at operation 7040 the system may solicit the subjective feedback from the manager. At operation 7045 this subjective feedback may be converted if necessary (e.g., according to the criteria) to one or more numerical values. At operation 7050 using all the external information and indicators as well as the subjective values, the system may calculate, using the criterion a score for the criterion. The process is repeated at operation 7055 if there are more criteria. If not, the score may be calculated at operation 7060. For example, the scores for the individual criterion may be summed. In some examples, an average may be calculated. In some examples, the individual criterion may be weighted prior to the summation.

As previously described, the system may calculate one or more weightings for criteria based upon one or more machine learning algorithms. FIG. 8 shows an example machine learning module 8000 according to some examples of the present disclosure. Machine learning module 8000 may be part of the joint investment management server 5010, joint investment framework client, or both. Machine learning module 8000 utilizes a training module 8010 and a prediction module 8020. Training module 8010 inputs historical transaction information 8030 for historical actions of the manager (including historical subjective information) into feature determination module 8050. The historical transaction information 8030 may be labeled with an indication of whether the decision made was ultimately successful. In some examples, the label may be subjectively entered by the manager, but in other examples, one or more labelling criteria may be utilized that may focus on objective performance metrics of the decision (e.g., how much money was made, stock price movement after the action, and the like). Example historical transaction information may include criteria at the time of the transaction and the like.

Feature determination module 8050 determines one or more features 8060 from this historical information 8030. Stated generally, features 8060 are a set of the information input and is information determined to be predictive of a particular outcome. Example features are given above. In some examples, the features 8060 may be all the historical activity data, but in other examples, the features 8060 may be a subset of the historical activity data. The machine learning algorithm 8070 produces a model 8080 based upon the features 8060 and the labels.

In the prediction module 8020, current action information 8090 may be input to the feature determination module 8100. Feature determination module 8100 may determine the same set of features or a different set of features from the current information 8090 as feature determination module 8050 determined from historical information 8030. In some examples, feature determination module 8100 and 8050 are the same module. Feature determination module 8100 produces feature vector 8120, which is input into the model 8080 to generate one or more criteria weightings 8130. The training module 8010 may operate in an offline manner to train the model 8080. The prediction module 8020, however, may be designed to operate in an online manner. It should be noted that the model 8080 may be periodically updated via additional training and/or user feedback.

The machine learning algorithm 8070 may be selected from among many different potential supervised or unsupervised machine learning algorithms. Examples of supervised learning algorithms include artificial neural networks, Bayesian networks, instance-based learning, support vector machines, decision trees (e.g., Iterative Dichotomiser 3, C4.5, Classification and Regression Tree (CART), Chi-squared Automatic Interaction Detector (CHAID), and the like), random forests, linear classifiers, quadratic classifiers, k-nearest neighbor, linear regression, logistic regression, and hidden Markov models. Examples of unsupervised learning algorithms include expectation-maximization algorithms, vector quantization, and information bottleneck method. Unsupervised models may not have a training module 8010. In an example embodiment, a regression model is used and the model 8080 is a vector of coefficients corresponding to a learned importance for each of the features in the vector of features 8060, 8120.

FIG. 9 illustrates a block diagram of an example machine 9000 upon which any one or more of the techniques (e.g., methodologies) discussed herein may perform. In alternative embodiments, the machine 9000 may operate as a standalone device or may be connected (e.g., networked) to other machines. In a networked deployment, the machine 9000 may operate in the capacity of a server machine, a client machine, or both in server-client network environments. In an example, the machine 9000 may act as a peer machine in peer-to-peer (P2P) (or other distributed) network environment. The machine 9000 may be a joint investment computing devices 1010, 1020, 4010, a joint investment management server 1030, 5010, may implement the methods of FIGS. 6 and 7, the machine learning modules of FIG. 8, and implement the GUIs of FIGS. 3 and 4. The machine 9000 may be a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 9000 may include a hardware processor 9002 (e.g., a central processing unit (CPU), a graphics processing unit (GPU), a hardware processor core, or any combination thereof), a main memory 9004 and a static memory 9006, some or all of which may communicate with each other via an interlink (e.g., bus) 9008. The machine 9000 may further include a display unit 9010, an alphanumeric input device 9012 (e.g., a keyboard), and a user interface (UI) navigation device 9014 (e.g., a mouse). In an example, the display unit 9010, input device 9012 and UI navigation device 9014 may be a touch screen display. The machine 9000 may additionally include a storage device (e.g., drive unit) 9016, a signal generation device 9018 (e.g., a speaker), a network interface device 9020, and one or more sensors 9021, such as a global positioning system (GPS) sensor, compass, accelerometer, or other sensor. The machine 9000 may include an output controller 9028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 9016 may include a machine readable medium 9022 on which is stored one or more sets of data structures or instructions 9024 (e.g., software) embodying or utilized by any one or more of the techniques or functions described herein. The instructions 9024 may also reside, completely or at least partially, within the main memory 9004, within static memory 9006, or within the hardware processor 9002 during execution thereof by the machine 9000. In an example, one or any combination of the hardware processor 9002, the main memory 9004, the static memory 9006, or the storage device 9016 may constitute machine readable media.

While the machine readable medium 9022 is illustrated as a single medium, the term "machine readable medium" may include a single medium or multiple media (e.g., a centralized or distributed database, and/or associated caches and servers) configured to store the one or more instructions 9024.

The term "machine readable medium" may include any medium that is capable of storing, encoding, or carrying instructions for execution by the machine 9000 and that cause the machine 9000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 9024 may further be transmitted or received over a communications network 9026 using a transmission medium via the network interface device 9020. The Machine 9000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 9020 may include one or more physical jacks (e.g., Ethernet, coaxial, or phone jacks) or one or more antennas to connect to the communications network 9026. In an example, the network interface device 9020 may include a plurality of antennas to wirelessly communicate using at least one of single-input multiple-output (SIMO), multiple-input multiple-output (MIMO), or multiple-input single-output (MISO) techniques. In some examples, the network interface device 9020 may wirelessly communicate using Multiple User MIMO techniques.

Other Notes and Examples

Example 1 is a computing device, the computing device comprising: one or more processors, and a memory communicatively coupled to the one or more processors and storing instructions, which when performed by the one or more processors, cause the computing device to perform operations comprising: receiving, through a user a graphical user interface (GUI) displayed on a display device, a notification of a requested action related to an asset jointly managed by the user and at least a second user; determining that the action requires an approval from the second user based upon a decision rule, the decision rule previously agreed upon by the user and the second user; sending a notification to the second user that their approval is requested; receiving the approval of the second user; and responsive to receiving the approval of the second user, causing execution of the action.

In Example 2, the subject matter of Example 1 optionally includes wherein the operations comprise: prior to receiving the approval, performing a tie-breaking process, the tie-breaking process comprising: receiving a criterion, the criterion specifying at least one financial metric related to the asset; obtaining the financial metric from a service; evaluating the criterion using the financial metric to produce a score; and displaying the score to the user.

In Example 3, the subject matter of Example 2 optionally includes wherein the operations of performing the tie-breaking process comprises: receiving a second criterion, the second criterion a subjective criteria; displaying the second criterion to the user; receiving input corresponding to the second criterion and converting the input to a second score; combining the score and the second score to produce a total score; and displaying the total score to the user.

In Example 4, the subject matter of Example 3 optionally includes wherein the operations of combining the score and the second score comprises multiplying the score by a first weight to produce a first component and the second score by a second weight to produce a second component; and adding the first and second components to produce the total score.

In Example 5, the subject matter of Example 4 optionally includes wherein the first weight and the second weight are input by the user, and wherein the operations comprise: adjusting the first and second weights based upon a machine learning algorithm, the machine learning algorithm trained using a plurality of historical transactions of the user labelled with an indication of whether each of the historical transactions was good or bad as judged from the perspective of the user.

In Example 6, the subject matter of any one or more of Examples 4-5 optionally include wherein if the total score of the user is above a predetermined threshold, approving the action.

In Example 7, the subject matter of any one or more of Examples 1-6 optionally include wherein the operations comprise: synchronizing one or more GUI elements with between the first user and the second user.

In Example 8, the subject matter of any one or more of Examples 1-7 optionally include wherein the operations comprise: opening a conversational communication channel between the user and the second user.

In Example 9, the subject matter of any one or more of Examples 7-8 optionally include wherein the conversational communication channel comprises one or more of: a short message conversation channel, a Voice over Internet Protocol (VOIP) channel, a voice channel, and a video channel.

Example 10 is a non-transitory machine readable medium comprising instructions, which when performed by a machine, cause the machine to perform operations comprising: receiving, through a user a graphical user interface (GUI) displayed on a display device, a notification of a requested action related to an asset jointly managed by the user and at least a second user; determining that the action requires an approval from the second user based upon a decision rule, the decision rule previously agreed upon by the user and the second user; sending a notification to the second user that their approval is requested; receiving the approval of the second user; and responsive to receiving the approval of the second user, causing execution of the action.

In Example 11, the subject matter of Example 10 optionally includes wherein the operations comprise: prior to receiving the approval, performing a tie-breaking process, the tie-breaking process comprising; receiving a criterion, the criterion specifying at least one financial metric related to the asset; obtaining the financial metric from a service; evaluating the criterion using the financial metric to produce a score; and displaying the score to the user.

In Example 12, the subject matter of Example 11 optionally includes wherein the operations of performing the tie-breaking process comprises: receiving a second criterion, the second criterion a subjective criteria; displaying the second criterion to the user; receiving input corresponding to the second criterion and converting the input to a second score; combining the score and the second score to produce a total score; and displaying the total score to the user.

In Example 13, the subject matter of Example 12 optionally includes wherein the operations of combining the score and the second score comprises multiplying the score by a first weight to produce a first component and the second score by a second weight to produce a second component; and adding the first and second components to produce the total score.

In Example 14, the subject matter of Example 13 optionally includes wherein the first weight and the second weight are input by the user, and wherein the operations comprise: adjusting the first and second weights based upon a machine learning algorithm, the machine learning algorithm trained using a plurality of historical transactions of the user labelled with an indication of whether each of the historical transactions was good or bad as judged from the perspective of the user.

In Example 15, the subject matter of any one or more of Examples 13-14 optionally include wherein if the total score of the user is above a predetermined threshold, approving the action.

In Example 16, the subject matter of any one or more of Examples 10-15 optionally include wherein the operations comprise: synchronizing one or more GUI elements with between the first user and the second user.

In Example 17, the subject matter of any one or more of Examples 10-16 optionally include wherein the operations comprise: opening a conversational communication channel between the user and the second user.

In Example 18, the subject matter of any one or more of Examples 16-17 optionally include wherein the conversational communication channel comprises one or more of: a short message conversation channel, a Voice over Internet Protocol (VOIP) channel, a voice channel, and a video channel.

Example 19 is a method for a computerized joint asset management, the method comprising: receiving, through a user a graphical user interface (GUI) displayed on a display device, a notification of a requested action related to an asset jointly managed by the user and at least a second user; determining that the action requires an approval from the second user based upon a decision rule, the decision rule previously agreed upon by the user and the second user; sending a notification to the second user that their approval is requested; receiving the approval of the second user; and responsive to receiving the approval of the second user, causing execution of the action.

In Example 20, the subject matter of Example 19 optionally includes wherein the method comprises: prior to receiving the approval, performing a tie-breaking process, the tie-breaking process comprising; receiving a criterion, the criterion specifying at least one financial metric related to the asset; obtaining the financial metric from a service; evaluating the criterion using the financial metric to produce a score; and displaying the score to the user.

In Example 21, the subject matter of Example 20 optionally includes wherein performing the tie-breaking process comprises: receiving a second criterion, the second criterion a subjective criteria; displaying the second criterion to the user; receiving input corresponding to the second criterion and converting the input to a second score; combining the score and the second score to produce a total score; and displaying the total score to the user.

In Example 22, the subject matter of Example 21 optionally includes wherein combining the score and the second score comprises multiplying the score by a first weight to produce a first component and the second score by a second weight to produce a second component; and adding the first and second components to produce the total score.

In Example 23, the subject matter of Example 22 optionally includes wherein the first weight and the second weight are input by the user, and wherein the method comprises: adjusting the first and second weights based upon a machine learning algorithm, the machine learning algorithm trained using a plurality of historical transactions of the user labelled with an indication of whether each of the historical transactions was good or bad as judged from the perspective of the user.

In Example 24, the subject matter of any one or more of Examples 22-23 optionally include wherein if the total score of the user is above a predetermined threshold, approving the action.

In Example 25, the subject matter of any one or more of Examples 19-24 optionally include wherein the method comprises: synchronizing one or more GUI elements with between the first user and the second user.

In Example 26, the subject matter of any one or more of Examples 19-25 optionally include wherein the method comprises: opening a conversational communication channel between the user and the second user.

In Example 27, the subject matter of any one or more of Examples 25-26 optionally include wherein the conversational communication channel comprises one or more of: a short message conversation channel, a Voice over Internet Protocol (VOIP) channel, a voice channel, and a video channel.

Example 28 is a device for a computerized joint asset management, the device comprising: means for receiving, through a user a graphical user interface (GUI) displayed on a display device, a notification of a requested action related to an asset jointly managed by the user and at least a second user; means for determining that the action requires an approval from the second user based upon a decision rule, the decision rule previously agreed upon by the user and the second user; means for sending a notification to the second user that their approval is requested; means for receiving the approval of the second user; and responsive to receiving the approval of the second user, means for causing execution of the action.

In Example 29, the subject matter of Example 28 optionally includes prior to receiving the approval, means for performing a tie-breaking process, the tie-breaking process comprising; means for receiving a criterion, the criterion specifying at least one financial metric related to the asset;

means for obtaining the financial metric from a service; means for evaluating the criterion using the financial metric to produce a score; and means for displaying the score to the user.

In Example 30, the subject matter of Example 29 optionally includes wherein the means for performing the tie-breaking process comprises: means for receiving a second criterion, the second criterion a subjective criteria; means for displaying the second criterion to the user; means for receiving input corresponding to the second criterion and means for converting the input to a second score; means for combining the score and the second score to produce a total score; and means for displaying the total score to the user.

In Example 31, the subject matter of Example 30 optionally includes wherein the means for combining the score and the second score comprises means for multiplying the score by a first weight to produce a first component and the second score by a second weight to produce a second component; and means for adding the first and second components to produce the total score.

In Example 32, the subject matter of Example 31 optionally includes wherein the first weight and the second weight are input by the user, and wherein the device comprises: means for adjusting the first and second weights based upon a machine learning algorithm, the machine learning algorithm trained using a plurality of historical transactions of the user labelled with an indication of whether each of the historical transactions was good or bad as judged from the perspective of the user.

In Example 33, the subject matter of any one or more of Examples 31-32 optionally include wherein if the total score of the user is above a predetermined threshold, means for approving the action.

In Example 34, the subject matter of any one or more of Examples 28-33 optionally include wherein the device comprises: means for synchronizing one or more GUI elements with between the first user and the second user.

In Example 35, the subject matter of any one or more of Examples 28-34 optionally include wherein the device comprises: means for opening a conversational communication channel between the user and the second user.

In Example 36, the subject matter of any one or more of Examples 34-35 optionally include wherein the conversational communication channel comprises one or more of: a short message conversation channel, a Voice over Internet Protocol (VOIP) channel, a voice channel, and a video channel.

What is claimed is:

1. A joint asset management system for executing an action related to an asset jointly managed by a first user and at least a second user, the system comprising:
   a first computing device of the first user and a second computing device of the second user, wherein the first and second computing devices are participant nodes on a blockchain;
   the first computing device comprising: one or more processors, and a memory communicatively coupled to the one or more processors and storing instructions, which when performed by the one or more processors, cause the one or more processors to perform operations, the operations comprising:
   storing a decision rule associated with the first and second users on the blockchain, a set of criteria for the first user, and a set of weights for adjusting the criteria, the decision rule stored as a smart contract on the blockchain;
   receiving, from the first user, via a first graphical user interface (GUI) on a display device of the first computing device, a request to execute the action, wherein the asset is a financial investment portfolio and the action is one of buying or selling shares of a financial security of a company;
   displaying, via the first GUI, the action, information about the company, selectable elements for buying or selling the financial security, a field for entering a quantity, and a chat window;
   determining that the action requires an approval from the second user based upon the decision rule;
   synchronizing the display of the action on the first GUI with a display of the action on a second GUI of the second computing device;
   identifying that the second user has rejected the action or that the approval from the second user has not been received within a specified time period;
   responsive to identifying that the second user has rejected the action or that the approval from the second user has not been received within the specified time period, receiving a selection to start a tie-breaking mode by the first user via the first GUI;
   responsive to receiving the selection to start the tie-breaking mode:
   evaluating each criterion in the set of criteria and calculating a score using a weighted summation of the evaluated criteria, each criterion of the criteria weighted by a corresponding weight from the set of weights;
   identifying that the action is approved based upon the score exceeding a threshold score;
   responsive to identifying that the action is approved, causing execution of the action to buy or sell the financial security of the company in an amount specified using the first GUI; and
   causing the set of weights for each of the criteria for the first user to be adjusted based upon a machine learning algorithm and the identification that the action is approved wherein the adjusted set of weights is stored on the blockchain.

2. The system of claim 1, wherein the operations further comprise:
   receiving a first criterion of the set of criteria, the first criterion including at least one financial criterion related to the asset;
   obtaining financial information about the financial criterion from a network-based service; and
   wherein evaluating each criterion in the set of criteria comprises evaluating the first criterion using the financial information.

3. The system of claim 2, wherein the operations further comprise:
   receiving a second criterion of the set of criteria, the second criterion a subjective criterion;
   wherein evaluating each criterion in the set of criteria comprises:
   causing display of the second criterion to the first user; and
   receiving input corresponding to the second criterion and converting the input to a numerical value.

4. The system of claim 1, wherein the decision rule specifies a threshold value per a unit of time.

5. The system of claim 1, wherein the operations further comprise: responsive to evaluating each criterion in the set of criteria and calculating the score using the weighted summation of the evaluated criteria, storing, in a smart contract on the blockchain, an indication that the action was approved.

6. The system of claim 1, wherein the operations further comprise:
opening a conversational communication channel between the first user and the second user.

7. A method for executing an action related to an asset jointly managed by a first user and at least a second user, the method comprising:
using one or more processors of a first computing device of the first user to perform operations comprising:
storing a decision rule associated with the first and second users on a blockchain, a set of criteria for the first user, and a set of weights for adjusting the criteria, wherein the first computing device and a second computing device of the second user are participant nodes on the blockchain, the decision rule stored as a smart contract on the blockchain;
receiving, from the first user, via a first graphical user interface (GUI) on a display device of the first computing device, a request to execute the action, wherein the asset is a financial investment portfolio and the action is one of buying or selling shares of a financial security of a company;
displaying, via the first GUI, the action, information about the company, selectable elements for buying or selling the financial security, a field for entering a quantity, and a chat window;
determining that the action requires an approval from the second user based upon the decision rule;
synchronizing the display of the action on the first GUI with a display of the action on a second GUI of the second computing device;
identifying that the second user has rejected the action or that the approval from the second user has not been received within a specified time period;
responsive to identifying that the second user has rejected the action or that the approval from the second user has not been received within the specified time period, receiving a selection to start a tie-breaking mode by the first user via the first GUI;
responsive to receiving the selection to start the tie-breaking mode:
evaluating each criterion in the set of criteria and calculating a score using a weighted summation of the evaluated criteria, each criterion of the criteria weighted by a corresponding weight from the set of weights;
identifying that the action is approved based upon the score exceeding a threshold score;
responsive to identifying that the action is approved, causing execution of the action to buy or sell the financial security of the company in an amount specified using the first GUI; and
causing the set of weights for each of the criteria for the first user to be adjusted based upon a machine learning algorithm and the identification that the action is approved wherein the adjusted set of weights is stored on the blockchain.

8. The method of claim 7, wherein the method further comprises:
receiving a first criterion of the set of criteria, the first criterion including at least one financial criterion related to the asset;
obtaining financial information about the financial criterion from a network-based service; and
wherein evaluating each criterion in the set of criteria comprises evaluating the first criterion using the financial information.

9. The method of claim 8, wherein the method further comprises:
receiving a second criterion of the set of criteria, the second criterion a subjective criterion;
wherein evaluating each criterion in the set of criteria comprises:
causing display of the second criterion to the first user; and
receiving input corresponding to the second criterion and converting the input to a numerical value.

10. The method of claim 7, wherein the decision rule specifies a threshold value per a unit of time.

11. The method of claim 7, wherein responsive to evaluating each criterion in the set of criteria and calculating the score using the weighted summation of the evaluated criteria, storing, in a smart contract on the blockchain, an indication that the action was approved.

12. The method of claim 7, wherein the method further comprises:
opening a conversational communication channel between the first user and the second user.

13. A non-transitory, machine-readable medium, storing instructions for executing an action related to an asset jointly managed by a first user and at least a second user, the instructions, when performed by a first computing device of the first user, cause the first computing device to perform operations comprising:
storing a decision rule associated with the first and second users on a blockchain, a set of criteria for the first user, and a set of weights for adjusting the criteria, wherein the first computing device and a second computing device of the second user are participant nodes on the blockchain, the decision rule stored as a smart contract on the blockchain;
receiving, from the first user, via a first graphical user interface (GUI) on a display device of the first computing device, a request to execute the action, wherein the asset is a financial investment portfolio and the action is one of buying or selling shares of a financial security of a company;
displaying, via the first GUI, the action, information about the company, selectable elements for buying or selling the financial security, a field for entering a quantity, and a chat window;
determining that the action requires an approval from the second user based upon the decision rule;
synchronizing the display of the action on the first GUI with a display of the action on a second GUI of the second computing device;
identifying that the second user has rejected the action or that the approval from the second user has not been received within a specified time period;
responsive to identifying that the second user has rejected the action or that the approval from the second user has not been received within the specified time period, receiving a selection to start a tie-breaking mode by the first user via the first GUI;
responsive to receiving the selection to start the tie-breaking mode:
evaluating each criterion in the set of criteria and calculating a score using a weighted summation of the evaluated criteria, each criterion of the criteria weighted by a corresponding weight from the set of weights;

identifying that the action is approved based upon the score exceeding a threshold score;

responsive to identifying that the action is approved, causing execution of the action to buy or sell the financial security of the company in an amount specified using the first GUI; and causing the set of weights for each of the criteria for the first user to be adjusted based upon a machine learning algorithm and the identification that the action is approved wherein the adjusted set of weights is stored on the blockchain.

14. The non-transitory, machine-readable medium of claim 13, wherein the operations further comprise:

receiving a first criterion of the set of criteria, the first criterion including at least one financial criterion related to the asset;

obtaining financial information about the financial criterion from a network-based service; and wherein evaluating each criterion in the set of criteria comprises evaluating the first criterion using the financial information.

15. The non-transitory, machine-readable medium of claim 13, wherein the operations further comprise:

receiving a second criterion of the set of criteria, the second criterion a subjective criterion;

wherein evaluating each criterion in the set of criteria comprises:

causing display of the second criterion to the first user; and receiving input corresponding to the second criterion and converting the input to a numerical value.

16. The non-transitory, machine-readable medium of claim 13, wherein the decision rule specifies a threshold value per a unit of time.

17. The non-transitory, machine-readable medium of claim 13, wherein responsive to evaluating each criterion in the set of criteria and calculating the score using the weighted summation of the evaluated criteria, storing, in a smart contract on the blockchain, an indication that the action was approved.

18. The non-transitory, machine-readable medium of claim 13, wherein the operations further comprise opening a conversational communication channel between the first user and the second user.

* * * * *